United States Patent Office 3,211,791
Patented Oct. 12, 1965

3,211,791
PHENOXYALKYL-HYDRAZINES
Jean Druey, Riehen, and Karl Schenker, Basel, Switzerland, assignors to Ciba Corporation, a corporation of Delaware
No Drawing. Filed Nov. 9, 1959, Ser. No. 851,522
Claims priority, application Switzerland, Dec. 1, 1958, 66,778/58; Oct. 13, 1959, 79,345/59
11 Claims. (Cl. 260—569)

The present invention relates to the manufacture of mono-aliphatically substituted hydrazines whose aliphatic radical contains an aryloxy group, of their acyl and carbonyl derivatives and of salts thereof.

The aryl radicals are preferably aromatic radicals containing at most two nuclei, such as phenyl or naphthyl radicals. They may be substituted, above all by free or substituted hydroxyl groups, for example, hydroxyl group substituted by lower aliphatic or cycloaliphatic hydrocarbon radicals, more especially by lower alkyl radicals such as methyl, ethyl, straight-chain or branched propyl, butyl or amyl radicals, lower alkyl radicals such as those mentioned above, or by halogen atoms, more especially chlorine or bromine atoms. These substituents may occupy one or more positions of the aryl nucleus.

The aliphatic radical contains with advantage 2 to 8 carobn atoms; preferably, it is an alkylene radical with 2 to 6 carbon atoms, which may also be substituted, for example by free or substituted, such as acylated, hydroxyl groups.

Acyl radicals are above all those of carboxylic acids, more especially of aliphatic carboxylic acids, such as lower fatty acids, or those of aromatic or heterocyclic carboxylic acids.

The carbonyl derivatives are preferably derived from aliphatic, aromatic or araliphatic aldehydes or ketones, such as lower alkyl ketones, e.g., acetone or benzaldehyde. The new hydrazines exert a valuable stimulating action on the central nervous system, with an unusual distribution of the points on which they act. They can thus be used for stimulating the functions of the central nervous system, for example for treating conditions of central nervous depression.

Of special value are compounds of the formula

Ph-O-alk-X-alk-NH-NH$_2$ and salts thereof, in which formula Ph represents a phenyl radical which may be substituted as mentioned hereinbefore, above all by halogen atoms or lower alkoxy groups, more especially methoxy or butoxy groups; alk represents an alkylene radical with 1–4 carbon atoms, preferably methylene, ethylene, ethylidene or propylidene; and X stands for a direct bond or a methylene or hydroxymethylene group. The group —Alk—X—Alk— contains especially 2–4 carbon atoms and is primarily an ethylene, propylene-(1,2)-, propylene-(1,3)-, or 2-hydroxy-propylene-(1,3)-group.

Special mention deserve 2-phenoxy-1-methylethyl-(1)-hydrazine of the formula

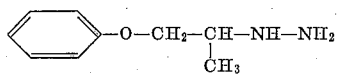

3-phenoxy-2-hydroxypropyl-(1)-hydrazine of the formula

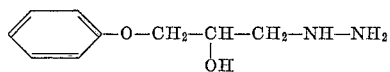

and 2-(para-chlorophenoxy)-ethyl-hydrazine of the formula

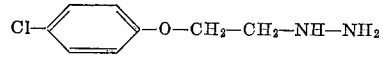

and the salts thereof.

The new hydrazines are prepared by methods as such known. According to a preferred method, in an aliphatic compound whose aliphatic radical is substituted by an aryloxy radical and which contains a radical convertible into a hydrazine group which may be acylated or carbonylated, said radical is so converted and, if desired, the resulting compound is acylated or converted into a carbonyl derivative thereof; or a resulting acyl or carbonyl derivative is converted into the free hydrazino compound; and/or a resulting base is converted into a salt thereof, or from a resulting salt the free base is prepared.

A radical convertible into a hydrazino group which may be acylated or carbonylated is above all a reactive converted hydroxyl group, especially an epoxy group, or a reactive esterfied hydroxyl group, such as a hydroxyl group esterfied with a strong inorganic acid, such as hydrochloric acid or a sulfuric acid, or with an organic sulfonic acid such as a benzenesulfonic acid, above all a halogen atom, such as a chlorine, bromine or iodine atom.

The conversion of such a group into the hydrazino group which may be acylated or carbonylated is advantageously performed by reaction with hydrazine or with a monoacyl or monocarbonyl derivative thereof; in the case of an epoxy group this reaction results in the formation of a free hydroxyl group in addition to the hydrazino group.

A radical convertible into the hydrazino group which may be acylated may alternatively be one that is convertible into such a group by reduction. Particularly suitable for this purpose is an imino group which is substituted by a free or monoacylated amino group, that is to say a hydrazone grouping. The reduction can be performed with nascent or catalytically activated hydrogen or with an agent yielding hydrogen, such as a complex metal hydride, and is advantageously carried out in a suitable solvent. The reduction is preferably carried out in an aqueous solution with hydrogen in the presence of a catalyst, such as finely divided platinum.

An acylatable compound formed—which may also be a compound containing free hydroxyl groups—can be acylated in the known manner, and from free hydrazines the hydrazones can be prepared in the known manner with the use of a carbonyl compound. On the other hand, an acyl or hydrazone compound formed can be converted into the free hydrazine by a known method, e.g., a hydrolysis operation.

The reactions according to the present process are carried out in the usual manner, in the presence or absence of a diluent, condensing agent and/or catalyst, at the ordinary or an elevated temperature, if desired under super-atmospheric pressure.

The starting materials are known or can be made by known methods.

The afore-mentioned processes can also be carried out with derivatives of the starting materials that are converted into the afore-mentioned starting materials themselves under the reaction conditions employed.

The new compounds form salts with inorganic and organic acids. Salt-forming acids are, for example, hydrohalic acids, sulfuric acid, phosphoric acid, nitric acid, perchloric acid; aliphatic, alicyclic, aromatic or heterocyclic carboxylic or sulfonic acids such as formic, acetic, propionic, oxalic, succinic, glycolic, lactic, malic, tartaric, citric, ascorbic, hydroxymaleic, dihydroxymaleic or pyroracemic acid; phenylacetic, benzoic, para-aminobenzoic, anthranilic, para-hydroxybenzoic, salicylic or para-aminosalicyclic acid; methanesulfonic, ethanesulfonic, hydroxyethanesulfonic or ethylenesulfonic acid; toluenesulfonic, naphthalenesulfonic acids or sulfanilic acid. A resulting salt can be converted in the known manner into its free base.

The new compounds, their salts and suitable mixtures thereof can be used, for example, in the form of pharmaceutical preparations which contain said compounds in admixture with a pharmaceutical organic or inorganic excipient suitable for enteral or parenteral administration. As such excipients are suitable substances that do not react with the compounds described, for example water, gelatine, lactose, starches, magnesium stearate, talc, vegetable oils, benzyl alcohols, gums, polyalkylene glycols, cholesterol or other known pharmaceutical excipients. The pharmaceutical preparations may be for example, in the form of tablets, dragees, or in liquid form solutions, suspensions or emulsions. If desired, the pharmaceutical preparations are sterilized and/or contain assistants such as preserving, stabilizing, wetting or emulsifying agents, and may also contain further therapeutically valuable substances. The preparations are formulated by conventional methods.

The invention further covers any modification of the present process in which the starting material used is an intermediate obtained at any stage thereof, and the remaining step or steps are carried out, or in which the process is terminated at any stage thereof, or in which the starting material is formed under the reaction conditions.

The following examples illustrate the invention.

*Example 1*

20.1 grams (0.1 mol) of 2-phenoxy-ethyl bromide and 12.8 grams (0.4 mol) of anhydrous hydrazine in 50 cc. of absolute methanol are heated for 4 hours at the boil. The solvent and the excess hydrazine are evaporated in a water-jet vacuum, 50 cc. of dilute ammonia are added to the residue, and the mixture is thoroughly extracted with chloroform. The chloroform extracts are washed once with a small amount of water, then dried over anhydrous sodium sulfate and evaporated. 2-phenoxy-ethyl-hydrazine of the formula

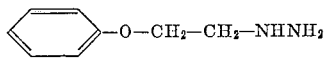

is obtained as a colorless to yellowish, viscous oil and is converted by adding methanolic hydrochloric acid into its hydrochloride which forms colorless crystals melting at 100 to 102° C.

*Example 2*

18.0 grams (0.1 mol) of 1-(ortho-methoxyphenoxy)-2:3-epoxypropane and 10 cc. of anhydrous hydrazine in 100 cc. of absolute toluene are refluxed for 2 hours. The reflux condenser is then removed, and the excess hydrazine is distilled off together with the solvent. This operation is repeated twice with 50 cc. of toluene each time. The residue is heated for 1 hour in a water-jet vacuum at 130° C. The resulting 3-(ortho-methoxyphenoxy)-2-hydroxypropyl-(1)-hydrazine of the formula

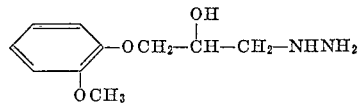

is a colorless, viscous oil.

Its oxalate is prepared thus:

10.3 grams of the crude base are dissolved in 20 cc. ethanol and added to a hot solution of 4.3 grams of anhydrous oxalic acid in 20 cc. of ethanol. After a short time the oxalate begins to crystallize out and is completely precipitated by adding 50 cc. of hot ethyl acetate, to yield 9.5 grams of colorless crystals melting at 138–139° C.

One recrystallization from methanol+ethyl acetate yields the analytically pure salt in the form of colorless needles melting at 154–155° C.

*Example 3*

11.8 grams (0.05 mol) of 2-(para-chlorophenoxy)-ethyl bromide and 6.4 grams of anhydrous hydrazine, reacted by the process described in Example 1, yield 2-(para-chlorophenoxy)-ethyl hydrazine of the formula

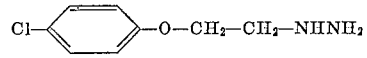

as a colorless oil from which the crystalline hydrochloride is obtained directly by neutralization with methanolic hydrochloric acid. On recrystallization from ethanol+ethyl acetate it forms colorless crystals melting at 108–109° C.

*Example 4*

13.5 grams (0.05 mol) of 2-(ortho:para-dichlorophenoxy)-ethyl bromide and 6.4 grams of anhydrous hydrazine, reacted as described in Example 1, yield 2-(ortho:para-dichlorophenoxy)-ethyl-hydrazine of the formula

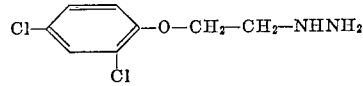

as a colorless oil which can be converted into the oxalate. On crysallization from aqueous ethanol it forms colorless crystals melting at 170° C. with decomposition.

*Example 5*

11.05 grams (0.05 mol) of 2-(ortho-methoxyphenoxy)-ethyl bromide and 6.4 grams of anhydrous hydrazine, reacted as described in Example 1, yield the oily 2-(ortho-methoxyphenoxy)-ethyl-hydrazine of the formula

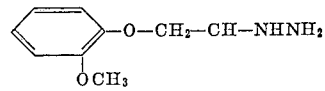

The hydrochloride, prepared in the usual manner, crystallizes from ethanol+ether in colorless hygroscopic needles melting at 118–120° C. On crystallization from ethanol+ether the bis-oxalate forms colorless crystals melting at 139–140° C.

*Example 6*

13.05 grams (0.05 mol) of 2-(ortho:ortho'-dimethoxyphenoxy)-ethyl bromide and 6.4 grams of anhydrous hydrazine, reacted as described in Example 1, yield 2-(ortho:ortho'-dimethoxyphenoxy)-ethyl-hydrazine of the formula

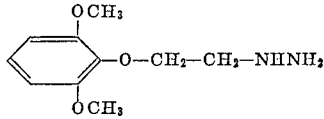

Its hydrochloride is prepared in the usual manner; on crystallization from methanol+ethanol it melts at 161–162° C.

*Example 7*

13.65 grams (0.05 mol) of 2-[meta-(n)-butoxyphenoxyl]-ethyl bromide and 6.4 grams of anhydrous hydrazine, reacted as described in Example 1, yield oily 2-[meta-(n)-butoxyphenoxy) - ethyl - hydrazine of the formula

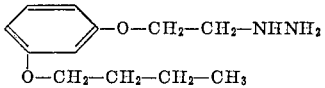

On crystallization from methanol+ethanol its hydrochloride melts at 94–95° C.

Example 8

A mixture of 23.4 grams of 1-phenoxypropyl-(2)-chloride and 20 grams of anhydrous hydrazine in 40 cc. of absolute ethanol is kept overnight at 20° C. The reaction mixture is then heated at the boil for 6 hours and finally evaporated in a water-jet vacuum. The residue is dissolved in cholorform, rendered alkaline with 50 cc. of dilute aqueous ammonia, freed from access hydrazine by being shaken three times with water, and then dried over anhydrous sodium sulfate. The solvent is distilled off and a colorless oil is obtained which is fractionated in a water-jet vacuum.

After a fore-running (11.2 grams of colorless liquid boiling at 105–110° C. under 11 mm. pressure;

$$n_D^{20} = 1.5208)$$

1-phenoxypropyl-(2)-hydrazine of the formula $$\langle\text{Ph}\rangle\text{—O—CH}_2\text{—CH—CH}_3$$
$$\qquad\qquad\qquad\quad|$$
$$\qquad\qquad\qquad\text{NHNH}_2$$

is obtained as a pale-yellow oil boiling at 145–147° C. under 11 mm. pressure.

The dihydrochloride forms colorless to yellowish, slightly hygroscopic crystals melting at 124–125° C. with decomposition.

The bis-oxalate crystallises from ethanol+ethyl acetate in the form of colorless crystals melting at 148° C. with decomposition.

1-phenoxypropyl-(2)-chloride, used as starting material, is prepared thus:

10 grams of sodium borohydride are dissolved in 75 cc. of water and 75 cc. of methanol and while being vigorously stirred added dropwise at 20° C. to a solution of 45 grams (0.3 mol) of phenoxyacetone in 50 cc. of methanol. When the evolution of hydrogen has subsided, the reaction solution is diluted with 300 cc. of water and repeatedly extracted with ether. The ethereal solution is dried over anhydrous sodium sulfate and then evaporated, to yield 45 grams of water-clear 1-phenoxypropanol-(2). The alcohol obtained in this manner is dissolved in 100 cc. of absolute benzene and while cooling the mixture thoroughly, 40 grams (0.33 mol) of water-clear thionyl chloride are added. The whole is refluxed for 8 hours, and the excess thionyl chloride and the solvent are removed in a water-jet vacuum. The dark-colored residue is taken up in ether and extracted first with ice-cold saturated sodium bicarbonate solution and then with water. The ethereal solution is dried over sodium sulfate, evaporated, and the residue is distilled in a water-jet vacuum. 1-phenoxypropyl-(2)-chloride is a colorless liquid boiling at 99–101° C. under 1 mm. pressure, which turns violet on prolonged storing. As the distillation residue 11.6 grams of a dark-colored resin are obtained.

Example 9

50 g. (1.0 mol) of phenoxyacetone are dissolved in 500 cc. of ethanol and treated, while stirring and cooling, with a solution having a neutral reaction of 50 g. (1 mol) of hydrazine hydrate in 500 cc. of 2 N-hydrochloride acid. The resulting 1-phenoxy-propylidene-(2)-hydrazine is hydrogenated at 25° C. under a gauge pressure of 20 atmospheres in the presence of 2 g. of platinum oxide. In the course of 2 hours, 22.4 l.(1 mol) of hydrogen are taken up. The hydrogenation is discontinued, the catalyst filtered off, the filtrate evaporated down to 400 cc., and treated with 500 cc. of 5 N-sodium hydroxide solution. The 1-phenoxy-propyl-(2)-hydrazine separates in the form of an oil. After extraction with chloroform there is obtained by fractionating distillation the same product as in Example 8. Under a pressure of 11 mm. of mercury it boils at 145–147° C.

Example 10

15 g. (0.1 mol) of phenoxy-acetone and 7.4 g. (0.1 mol) of acetyl hydrazine are put together. In an exothermic reaction a viscous oil is formed which, after 1 hour, is mixed with ether. The N-[1-phenoxy-propylidene-(2)-]-N'-acetyl-hydrazine of the formula $$\langle\text{Ph}\rangle\text{—O—CH}_2\text{—C}\begin{smallmatrix}\diagup\text{CH}_3\\ \diagdown\text{N—NH—COCH}_3\end{smallmatrix}$$

crystallizes in the form of colorless scales of melting point 117–119° C.

10.6 g. (0.05 mol) of this compound are catalytically hydrogenated in 50 cc. of glacial acetic acid in the presence of 0.3 g. of platinum oxide. When 1 mol of hydrogen is taken up, the hydrogenation is discontinued, the catalyst filtered off with suction, and the filtrate evaporated in a water-jet vacuum. The residue is rendered alkaline with 100 cc. of dilute aqueous ammonia and extracted with chloroform. The extracts are subjected to fractionating distillation under a high vacuum and the N-[1 - phenoxy - propyl - (2)] - N'-acetylhydrazine of the formula $$\langle\text{Ph}\rangle\text{—OCH}_2\text{—CH}\begin{smallmatrix}\diagup\text{CH}_3\\ \diagdown\text{NHNH—COCH}_3\end{smallmatrix}$$

obtained in the form of a pale yellow oil boiling at 140–143° C. under a pressure of 0.08 mm. of mercury. By careful acid saponification of this product there is obtained in the usual manner the 1-phenoxy-propyl-(2)-hydrazine described in Example 8.

Example 11

20.1 g. (0.1 mol) of phenoxy-ethylbromide and 7.4 g. (0.1 mol) of acetyl hydrazine are refluxed for 12 hours in 50 cc. of ethanol. The solvent is then evaporated and the residue rendered alkaline with dilute aqueous ammonia. On extraction with chloroform and distillation in a high vacuum there is obtained the N-(2-phenoxyethyl)-N'-acetyl hydrazine of the formula $$\langle\text{Ph}\rangle\text{—OCH}_2\text{—CH}_2\text{—NH—COCH}_3$$

in the form of a pale yellow oil boiling at 135–138° C. under a pressure of 0.05 mm. of mercury.

What is claimed is:

1. A member selected from the group consisting of compounds of the formula

Ph—O—Alk—X—NH—NH$_2$ wherein Ph represents phenyl, Alk stands for alkylene containing 1 to 4 carbon atoms and X for a member selected from the group consisting of the group of the formula $$\text{—CH—(CH}_2)_n\text{—}$$
$$\quad|$$
$$\text{CH}_3$$

wherein $n$ stands for an integer from 0 to 4 and the group of the formula $$\text{—CH—CH}_2\text{—}$$
$$\quad|$$
$$\text{OH}$$

and therapeutically useful acid addition salts thereof.

2. A member selected from the group consisting of compounds of the formula

Ph—O—CH$_2$—CH$_2$—(CH$_2$)$_n$—NH—NH$_2$ wherein Ph represents a member selected from the group consisting of hydroxylphenyl, lower alkoxy-phenyl, lower alkyl-phenyl and halogeno-phenyl, and $n$ stands for an integer from 0 to 4, and therapeutically useful acid addition salts thereof.

3. Compounds of the formula

Ph—O—Alk—NH—NH$_2$ wherein Ph is a phenyl radical and Alk represents a branched alkylene-(1,2) radical having at most 6 carbon atoms.

4. A member selected from the group consisting of 2-phenoxy-1-methyl-ethyl-(1)-hydrazine of the formula

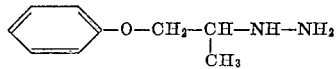

and therapeutically useful acid addition salts thereof.

5. A member selected from the group consisting of 3-phenoxy-2-hydroxy-propyl-(1)-hydrazine of the formula

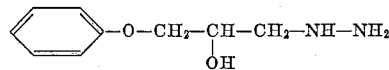

and therapeutically useful acid addition salts thereof.

6. A member selected from the group consisting of 2-(para-chlorophenoxy)-ethyl-hydrazine and therapeutically useful acid addition salts thereof.

7. A member selected from the group consisting of 3-(ortho - methoxyphenoxy) - 2 - hydroxy - propyl - (1)-hydrazine and therapeutically useful acid addition salts thereof.

8. A member selected from the group consisting of 2 - (ortho,para - dichlorophenoxy) - ethyl - hydrazine and therapeutically useful acid addition salts thereof.

9. A member selected from the group consisting of 2-(ortho-methoxyphenoxy)-ethyl-hydrazine and therapeutically useful acid addition salts thereof.

10. A member selected from the group consisting of 2-(ortho,ortho'-dimethoxyphenoxy) - ethyl-hydrazine and therapeutically useful acid addition salts thereof.

11. A member selected from the group consisting of 2-[meta-(n)-butoxyphenoxy] - ethyl-hydrazine and therapeutically useful acid addition salts thereof.

References Cited by the Examiner

UNITED STATES PATENTS

| | | | |
|---|---|---|---|
| 2,744,935 | 5/56 | Johner | 260—569 |
| 2,912,461 | 11/59 | Donovan | 260—562 |
| 2,929,844 | 3/60 | Surrey | 260—562 |
| 2,933,532 | 4/60 | Schumann | 260—569 |
| 2,957,873 | 10/60 | Rudner | 260—569 XR |

OTHER REFERENCES

Gabriel, "Berichte Deut. Chem.," vol. 47, pages 3028–33 (1914).

CHARLES B. PARKER, *Primary Examiner.*

IRVING MARCUS, LEON ZITVER, *Examiners.*

UNITED STATES PATENT OFFICE
CERTIFICATE OF CORRECTION

Patent No. 3,211,791

October 12, 1965

Jean Druey et al.

It is hereby certified that error appears in the above numbered patent requiring correction and that the said Letters Patent should read as corrected below.

Column 1, line 27, for "carobn" read -- carbon --; column 4, line 67, for "phenoxyl]-ethyl" read -- phenoxy]-ethyl --; column 5, line 11, for "access" read -- excess --; line 55, for "1 mm." read -- 11 mm. --; line 60, for "50 g." read -- 150 g. --; same column 5, line 63, for "N-hydrochloride read -- N-hydrochloric --; column 6, line 7, for "(2)-]-N'-" read -- (2)]-N'- --.

Signed and sealed this 26th day of July 1966.

(SEAL)
Attest:

ERNEST W. SWIDER
Attesting Officer

EDWARD J. BRENNER
Commissioner of Patents